United States Patent

[11] 3,631,337

| [72] | Inventor | Paul M. MacKinney<br>1012 East Geneva Road, Wheaton, Ill. 60187 |
|---|---|---|
| [21] | Appl. No. | 834,036 |
| [22] | Filed | June 17, 1969 |
| [45] | Patented | Dec. 28, 1971 |

[54] MOISTURE MEASURING AND TOTALIZING SYSTEM
7 Claims, 10 Drawing Figs.

| [52] | U.S. Cl. | 324/65 R |
|---|---|---|
| [51] | Int. Cl. | G01r 27/02 |
| [50] | Field of Search | 324/61, 65 |

[56] References Cited
UNITED STATES PATENTS

| 2,607,830 | 8/1952 | Razek | 324/61 |
|---|---|---|---|
| 2,703,386 | 3/1955 | Seney | 324/65 |
| 3,141,129 | 7/1964 | Dietert | 324/65 |
| 3,172,175 | 3/1965 | Hartley | 22/89 |

*Primary Examiner*—Edward E. Kubasiewicz
*Attorney*—Hume, Clement, Hume & Lee

ABSTRACT: A system for measuring the moisture entrained in a batch of aggregate material discharged from a storage hopper and for compensating for said moisture in a batch-mixing apparatus. The system includes a plurality of electrical probes arranged to project into a free-falling stream of aggregate material in a plurality of vertical portions of said stream, as said stream is discharged from the storage hopper. Electrical circuit means connected to said probes create an electrical signal proportional to the conductivity and hence the moisture content of each vertical portion of the aggregate stream. Signal accumulating means is also provided to accumulate and integrate said electrical signals during the time interval of aggregate material flow past said probes to provide a resultant electrical signal which is proportional to the total entrained moisture in the aggregate batch. Data-recording means is also provided to provide indicia of said moisture content of said aggregate in response to said resultant signal.

Inventor.
Paul M. MacKinney.
By Hume, Clement, Hume & Lee.
Attys.

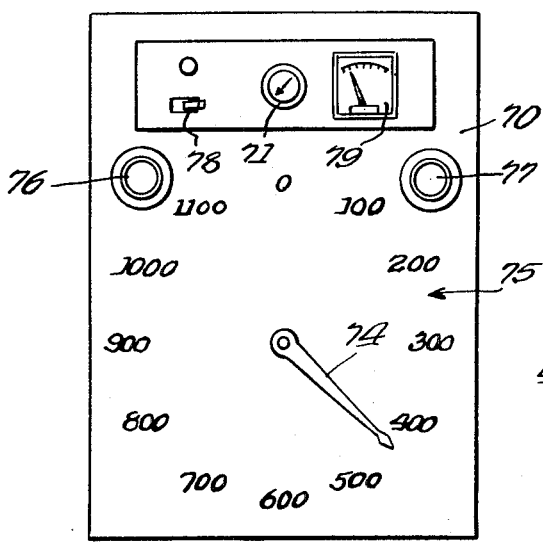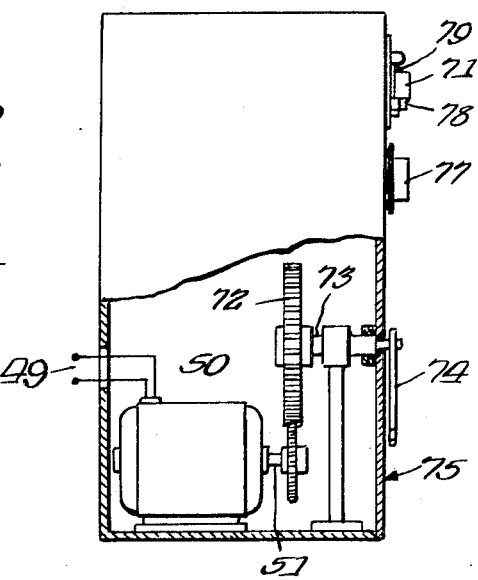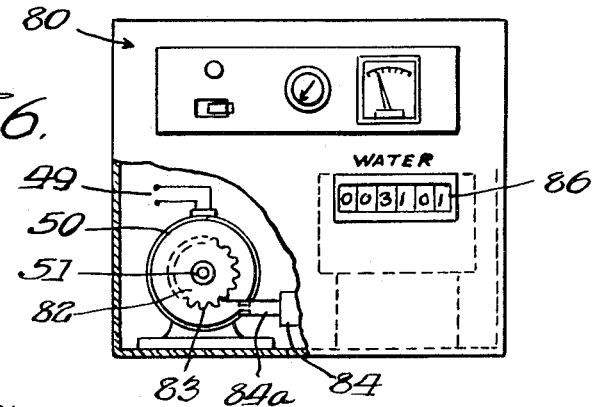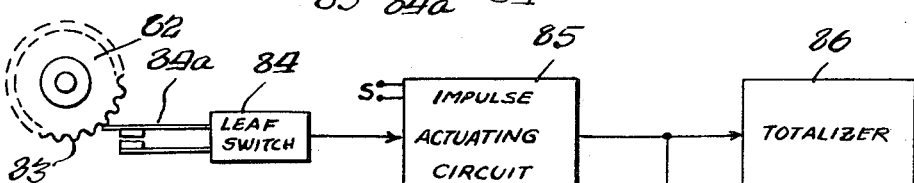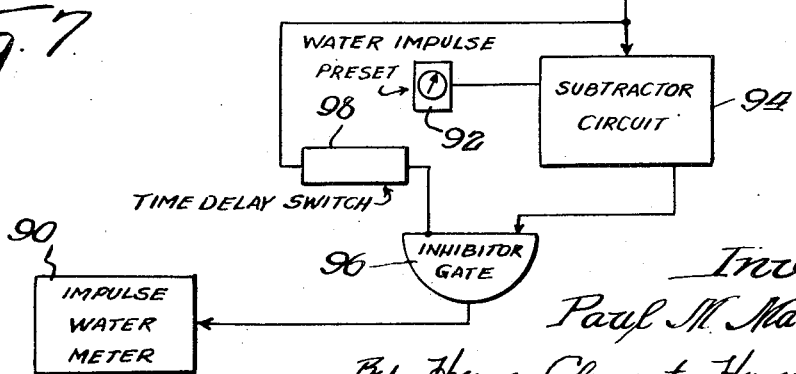

Inventor.
Paul M. MacKinney,
By Hume, Clement, Hume, & Lee
Attys.

MOISTURE MEASURING AND TOTALIZING SYSTEM

BACKGROUND AND GENERAL DESCRIPTION

This invention generally relates to a moisture control system and apparatus and more specifically relates to a system and apparatus for sensing and totalizing the entrained moisture in aggregate materials such as sand, stone, and the like.

As fully discussed in my previous U.S. Pat. No. 3,117,640, the moisture entrained in aggregate materials creates a constant problem when such materials have to be mixed with water, such as in the manufacture of concrete. If the entrained moisture is not properly measured and compensated for in the concrete-mixing process, for instance, the resulting concrete will have a poor consistency and a variable slump.

Field operations have indicated that the general concepts embodied in the apparatus described and claimed in my previous patent are sound, and that invention has proven to be a successful apparatus for compensating for entrained moisture. However, the commercial embodiment of the apparatus, as illustrated in the drawings of said patent, involved a combination of electromechanical and fluidic means for sensing the entrained moisture in an aggregate and adjusting the batching scales for the aggregate and water proportionately to compensate for the entrained moisture. The commercial embodiment of such system was therefore difficult to adapt for use with current electronic weighing and batching systems. My field experience thus has indicated the need for an improved apparatus incorporating the general concepts of the apparatus described and claimed in my previous patent, which would create an electronic signal accurately reflecting the total entrained moisture in an aggregate batch and which could be converted to a proportionate electronic value for use in the measuring and weighing circuitry of electronic batch-weighing systems.

Numerous devices have been devised in the past in an effort to sense entrained moisture in aggregate materials and the like electronically and to convert that sensed data into a proportionate electronic value which could be fed into the circuitry of an electronic batching system. One such prior device is described in U.S. Pat. No. 3,252,530, issued to A. G. Bale, Jr., on May 24, 1966, wherein a single electrode unit is placed in the discharge chute of an aggregate hopper to create an electrical signal which is proportional to the surface moisture of the aggregate in the hopper. Another prior device is illustrated in U.S. Pat. No. 2,750,144, issued to R. C. Beckwith, on June 12, 1956, wherein a neutron source and detector are provided in the discharge throat of an aggregate hopper to create an electronic signal proportional to the moisture sensed in the aggregate.

These devices such as illustrated in the Bale and the Beckwith patents provide only partial solutions to the problems presented by electronic batch measuring and weighing, because such devices fail to accurately measure the total moisture entrained in an aggregate batch. Since these prior systems rely upon a single moisture reading, taken at an arbitrary time during the batching process, the systems have the inherent disadvantage of locking into the weighing circuitry an electronic signal which is not proportionate to the moisture entrained in the bath. Substantial errors result from the inability of these systems to account for the variations in moisture content of the aggregate batch caused by random distribution of water in the aggregate, both vertical and horizontal stratification of the entrained moisture and variations in the aggregate compaction. In practice, a single moisture reading taken in one location of an aggregate batch has not been found to produce a signal accurately representative of the moisture in the entire batch.

Accordingly, I have invented the system and apparatus which eliminates the foregoing problems presented by previous devices. This present invention also is an improvement in the system disclosed in my previously issued patent which permits the moisture sensing signals to be readily adaptable for use in an electronic weighing and batching system.

To avoid the inaccuracies presented by a single reading of the entrained moisture in an aggregate batch, the system in accordance with the present invention relies upon a plurality of moisture readings which are taken continuously as the batch is dispensed from the storage hopper into the weighing or mixing hopper. Moreover, the present system utilizes moisture readings from a plurality of locations in the free-falling stream of aggregate. Thus, unlike prior attempts to accurately sense the moisture in aggregates, the present system will produce a moisture reading which is unaffected by the compaction, stratification or gradation of the aggregate material.

Furthermore, in accordance with this invention, the plurality of moisture readings are taken from a plurality of locations throughout the entire time during which the batch is being dispensed, and then are electronically integrated and totalized. As a result, the totalized electronic value of the moisture signal is an accurate representation of the total moisture content of the aggregate batch. The accurate electronic signal hence can be utilized to adjust the weight of aggregate material and the weight or volume of water which are mixed, to thereby compensate for the total entrained water in the aggregate batch.

In one form of the system, the signal, which is proportionate to the total moisture content of the aggregate batch, is used to operate visual or audible indicia which permits manual adjustment of the batching system to compensate for the entrained water. In another embodiment, the signal is converted into impulses, by the appropriate circuitry, so as to automatically adjust the water added to the mixture by sending appropriate compensating signals to an impulse-counting water meter. Finally, in a third embodiment the electronic signal is connected through appropriate circuitry to the electronic aggregate and water weighing and dispensing circuits of an electronic batching system to automatically compensate for the entrained moisture in the aggregate by increasing the aggregate and decreasing the water mixed in the batching process.

Further objects, features, and advantages of the present moisture compensating system will become apparent from the following description of several embodiments thereof, taken in conjunction with the drawings, in which:

FIG. 4 is a schematic illustration of one form of data-recording device which can be incroporated in the system of this invention to register the amount of entrained moisture sensed by the electrodes illustrated in FIGS. 1–3;

FIG. 5 is a side view, in partial section, of the data-recording device illustrated in FIG. 4;

FIG. 6 is a schematic illustration of a second form of data-recording device for receiving the electronic signals from the electrodes illustrated in FIGS. 1–3 and converting the signals into a train of impulses representative of the entrained moisture measured by the electrodes;

FIG. 7 is a schematic illustration of a suitable circuit for utilizing the second form of data recorder, as illustrated in FIG. 6, to convert the electrode signals into an impulse train which automatically adjusts a preset impulse water meter to thereby compensate for the entrained moisture sensed by the electrodes;

EXEMPLARY EMBODIMENTS

Figure 1:
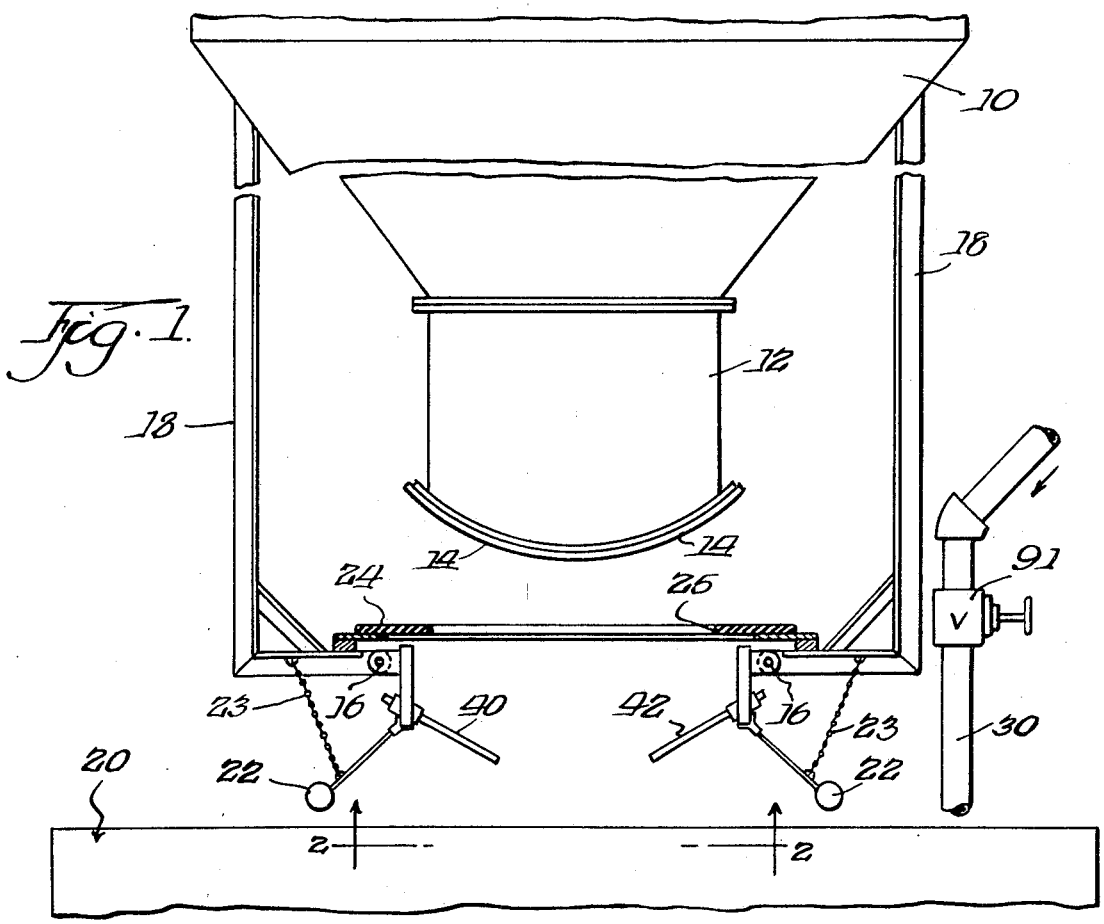
FIG. 1 is an elevational view, in partial section, illustrating the location of the moisture-sensing electrodes of the present system adjacent the discharge chute of an aggregate batching hopper.

Referring initially to FIG. 1 of the drawings, the system in accordance with this invention is designed for use with a weighing and batching system which includes an aggregate storage hopper 10, a suitable weighing hopper 20, and a water supply 30. As well known by those skilled in the art, aggregate material, such as sand or stone or the like, is stored in the hopper 10 and is selectively dispensed into the weighing hopper 20. From the weighing hopper 20, the material may be charged into a suitable mixer (not shown) where the material may be mixed with other aggregates and with water from the supply 30.

The storage hopper 10 includes a conventional discharge chute 12, having a selected cross-sectional area, through which the aggregate stored in the hopper 10 can be discharged. Swinging gates 14 extend across the lower end of the chute 12 and can be operated to selectively dispense the desired amount of aggregate through the chute at a constant rate of flow. These gates 14 can be automated by suitable control devices (not shown) so that the gates will dispense a selected weight or volume of aggregate from the storage hopper 10 into the weighing hopper 20. Of course, the moisture-compensating system in accordance with this invention can be used with other suitable dispensing and weighing apparatus, and can be used in systems for mixing aggregates for end uses other than concrete without departing from the spirit or scope of this invention.

In accordance with this invention, a plurality of electronic probes 40, 42 is placed directly below the throat 12 of the storage hopper 10, in a position which assures that the probes will extend into the stream of the free-falling aggregate when the hopper gates 14 are opened. As indicated in FIG. 1, these probes 40, 42 are supported in a declining position in the path of the discharged aggregate by being pivotally connected, by a pivot pin 16 or the like, to a suitable supporting structure 18. The pivoted mounting and the declining position of the probes 40, 42 will allow the probes to deflect out of the aggregate path when a foreign object or compacted mass of aggregate is discharged from the hopper 10. Without such pivoted arrangement, the foreign object or compacted aggregate would restrict the flow of aggregate past the probes and would possibly short circuit the probes and thereby result in a false moisture signal for the batch. Counterweights 22 and associated supporting chains 23 balance the probes 40 so that the probes will continue to project into the free-falling aggregate stream under normal conditions.

Furthermore, a flexible skirt 24, made from a suitable wear-resistant elastomeric material, is mounted to the support structure 18 directly above the probes 40. This skirt 24 includes a central aperture 25, which is preferably square, through which the aggregate stream will flow. The skirt 24 thereby confines the free-falling aggregate stream and protects the probes and the adjacent portions of the structure 18 from being damaged, or from accumulating an excessive amount of aggregate.

Figures 2, 3:
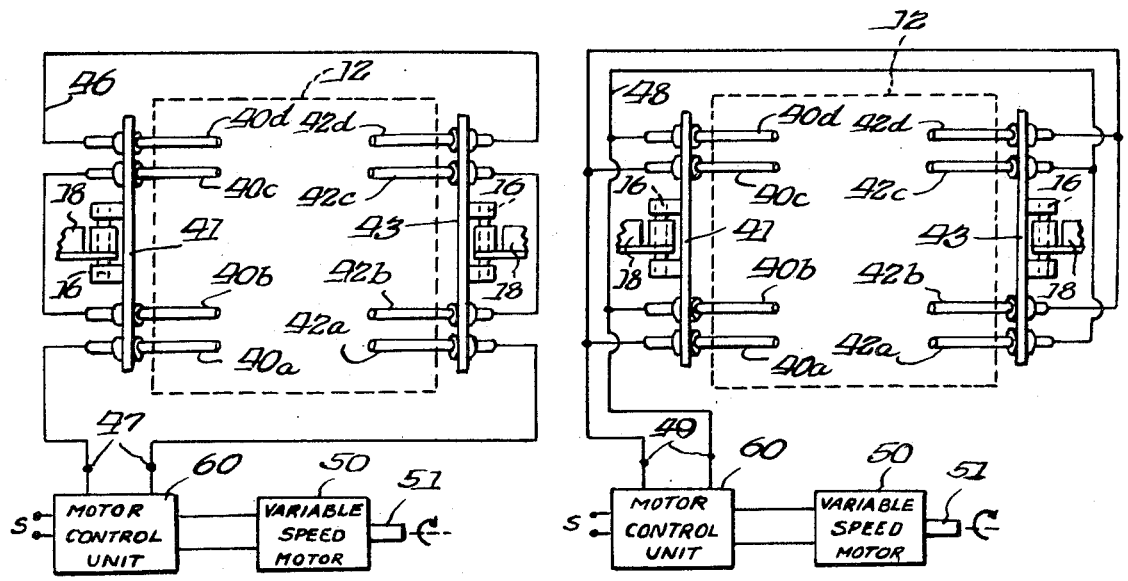
FIG. 2 is a plan view of the electrodes, as viewed along the line 2—2 in FIG. 1, illustrating the location of the electrodes with respect to the hopper discharge chute, and schematically illustrating a series circuit connection for the electrodes.
FIG. 3 is a view of the electrodes corresponding to FIG. 2, and illustrating a parallel circuit connection for the electrodes.

As clearly indicated in FIGS. 2 and 3, the system in accordance with this invention preferably includes four probes 40a–d arranged on an insulating support plate 41 along one side of the hopper chute 12, and four probes 42a–d arranged on a similar insulating plate 43 along the other side of the hopper chute. The probes are arranged on the insulating plates 41 and 43 so that a pair of closely spaced probes (e.g., 40a and 40b; 40c and 40d; 42a and 42b; and 42c and 42d) project into each quadrant of the free-falling aggregate stream. By this arrangement, a measurable electrical current can flow through the portion of the aggregate stream flowing between the adjacent probes (e.g., 40a and 40b) to complete an electrical circuit. The probes 40 and 42 are spaced laterally a sufficient distance so that there will be no opportunity for a short circuit to occur across the aligned probes, such as between the probes 40a and 42a.

The electrical conductivity of the aggregate stream will be directly related to the amount of moisture entrained in the aggregate. As illustrated in FIGS. 2 and 3, when the energy source "F" is activated, current will flow from the source S through the aggregate stream between the adjacent pairs of electrodes (e.g., 40a and b) and produce a current or voltage signal of varying amplitude at the terminals 47, 49 that is directly proportional to the moisture entrained in the flowing aggregate, so that the system of this invention will create a measurable electronic signal which is proportional to the moisture entrained in each quadrant of the flowing aggregate stream. Such signals are thereby unaffected by any vertical stratification of the moisture in the aggregate batch.

From the above description, it is also apparent that horizontal stratification of the moisture in a batch of aggregate can be accounted for in this system by taking moisture readings from each quadrant of the flowing aggregate stream continuously as the aggregate flows past the probes 40, 42. The resulting plurality of electrical signals then can be integrated and totalized to provide a final output signal which is directly proportional to and an accurate representation of the total entrained moisture content of the entire batch of aggregate.

Thus, this resulting output signal can be utilized to create a visual or audible signal of the entrained water content of the batch, so that manual adjustment of the water and aggregate of a mixture can be made. Alternatively, the output signal of this system can be employed to create an input signal for electronic weighing and batching circuitry which allows an electronic batching system to automatically compensate for the entrained moisture in the aggregate.

FIGS. 2 and 3 illustrate two acceptable means of electrically connecting the above described probes 40, 42 to pick up the measurable variations in current which will flow through the aggregate stream during a batching operation.

FIG. 2 illustrates a circuit 46 for connecting the probes in series so that the current is directed through the aggregate stream in all four quadrants, across the gap between the pairs of closely spaced probes (e.g., 40a and 40b). The total output signal of the circuit 46, registered at the output leads 47, therefore will be proportional to the conductivity, and thus to the moisture content of the aggregate flowing through the four quadrants. FIG. 3 illustrates a circuit 48 which connects the probes so that the pairs of closely spaced probes (such as 40a and b and 40c and d) are in parallel. This parallel circuit connection likewise produces an output signal at the output leads 49 which is proportional to the conductivity of the aggregate flowing through the four quadrants. Either the series circuit 46 or the parallel circuit 48 can be employed in the system of this invention. The choice of circuits will depend upon the field conditions, such as the compaction of the aggregate, prevailing at the particular installation.

As also indicated in FIGS. 2 and 3, the output leads 47 or 49 for the probe circuit are connected to a variable speed motor 50 through a suitable motor control unit 60. The motor 50 preferably comprises a direct current servomotor which has a wide speed range and which will quickly respond to the variations in a reference voltage to vary the motor output speed proportionately. In addition, the motor control unit includes suitable transformer and amplifier components to convert the varying voltage signal occurring across the probe circuit leads 47 or 49 into a proportionately varying reference voltage for the motor 50. The control 60 is designed to start the operation of the motor 50 when the probe circuit is completed by the initial flow of aggregate past the probes 40 and 42 and to stop the motor 50 when the flow of the aggregate ends. The control 60 also functions to totalize and time-integrate the signals at the probe leads 47 or 49 so that the total output revolutions for the shaft 51 of the motor 50 is proportional to the total moisture of the aggregate batch, as measured by the probes 40 and 42. Suitable motors and control units for performing the above functions are presently available from Electro-Craft Corporation, 1600 Second Street, Hopkins, Minnesota, under the Electro-Craft Stock Nos. E150MG and E150M, respectively.

Therefore, since the circuits illustrated in FIGS. 2 and 3 are completed when the aggregate flow begins and are broken when the aggregate flow stops, the total output revolutions of the motor shaft 51 is a direct function of the time span through which the aggregate flows past the probes 40, 42. Thus the revolutions of the motor shaft 51 are proportional to the size of the aggregate batch, and would be the direct measure of the batch size under the ideal conditions where the moisture is uniformly distributed in the aggregate. Moreover, the speed of the motor shaft 51 will be varied during the flow of the aggregate, by the varying signal produced at the probe output leads 47 or 49. Accordingly, the total output revolutions of the shaft 51 will be proportional to the moisture content of the aggregate, as well as to the total size of the aggregate batch. The motor shaft 51 can thereby be utilized to indicate the total entrained moisture in the batch of aggregate dispensed from the hopper 10.

FIGS. 4 and 5 illustrate one form of data-recording device 70 which can be coupled to the motor 50 to indicate the total entrained moisture sensed by the above-described system. In this device 70, the motor 50 is coupled to a gear train 72 which reduces the output of the motor shaft 51. In the preferred arrangement, the gear train 70 is selected so that an output shaft 73 of the gear train will revolve less than one complete revolution, even for the largest anticipated aggregate batch. With this arrangement, an indicator arm 74 can be mounted on the gear train shaft 73, and a numerical dial face 75 can be provided on the device 70. It is apparent that the rotation of the arm 74 will represent the proportionate rotation of the motor shaft 51, and will therefore represent the total amount of entrained moisture cumulatively measured by the probes 40, 42 and the associated circuitry. The device 70 hence can be calibrated to provide a visual reading of the total moisture content of a batch of aggregate.

The device 70 also includes a suitable reset circuit (not shown) to reset the arm 74 and the motor 50 back to their zero positions after each aggregate batch. Further, the device 70 includes conventional manual speed adjustment controls 71, zero and span adjustment controls 76 and 77, and a control switch 78. If desired, an r.p.m. counter 79 can be incorporated in the device to provide a visual reading of the actual speed of the motor shaft 51.

When calibrating the device 70, the zero and span controls 76 and 77 are adjusted to the desired settings to meet the particular field conditions. Then, when using the device 70, the operator of the aggregate weighing and batching system would operate suitable controls (not shown) to open the gates 14 and start the discharge of the batch of aggregate from the hopper 10. The flow of the batch of aggregate past the probes 40, 42 will then cause the motor shaft 51 and the indicator arm 74 to rotate in proportion to the moisture in the aggregate. The arm 74 and dial 75 will thereby provide visual reading of the entrained moisture, and the operator can adjust the size of the aggregate and water to be mixed to compensate for this measured moisture.

FIG. 6 illustrates a second form of data-recording device 80 which can be utilized with the present moisture-compensating system, and which is particularly suited for use with a batching system which includes impluse-counting type water meters. To create the electrical impulses for use in such a system, the device 80 includes a gear head 82 mounted on the motor shaft 51, and a leaf spring switch 84 positioned adjacent the gear head. The gear head 82 has a selected number of teeth 83 which will engage with the contact arms 84a of the switch 84 as the motor shaft 51 revolves. By this arrangement, the motion of each tooth 83 will close the switch 84, and each partial revolution of the gear 82 will produce a known train of electrical impulses. The impulse output of the switch 84 is thus directly proportional to the revolutions of the motor 50 and to the total entrained aggregate moisture sensed by the probes 40 and 42. This impulse output of switch 84 hence can be used to energize an impulse-actuating circuit 85 (FIG. 7) including suitable solenoid devices. The circuit 85 in turn can be arranged to energize a digital display counter and totalizer 86 which is calibrated to indicate the total gallons or pounds of aggregate moisture sensed by the probes. The batching system operator then can use this data to adjust the size of the aggregate batch.

The impulse output of the switch 84 also can be utilized to automatically adjust an impulse-counting water meter to decrease the size of the water batch from a preset value to a value which compensates for the entrained moisture in the aggregate. As indicated in FIG. 7, a suitable circuit for accomplishing this water meter adjustment includes an impulse water meter 90 which is coupled to the impulse-actuating circuit 85 and the impulse totalizer 86. As well known to those skilled in the art, the impulse water meter 90 is designed to control the operation of a water valve, such as the valve 91 illustrated in FIG. 1, in response to an impulse signal, so that a given number of impulses received by the meter results in the discharge of a selected quantity of water through the valve and into the batch mixing apparatus. Suitable control means, such as the span and zero adjustment referred to with respect to the data recorder 70, also can be included on the device 80.

The circuit for the impulse water meter 90 also includes a preset switch 92 through which a set signal can be fed into the circuit. The magnitude of the preset signal is chosen by the batch system operator to send a selected number of impulses to the meter 90, and thereby discharge a proportional amount of water through the meter. In accordance with this invention, this circuit also includes a suitable subtracter circuit 94 which is adapted to receive the impulses created by the circuit 85 and subtract those impulses from the impulses fed into the circuit by the preset switch 92. Finally, the circuit includes an inhibitor gate 96 and a time delay switch 98. The inhibitor gate 96 inhibits the conduction of any impulses to the impulse water meter 90 until after the subtracter circuit 94 has functioned to subtract the impulses emitted by the actuating circuit 85 from the impulses fed into the circuit by the preset switch unit 92. In turn, the time delay gate 98 functions to delay the removal of the inhibit signal from the inhibitor gate 96 until after the total aggregate batch has been dispensed from the hopper 10, and the impulse-actuating circuit 85 has transmitted corresponding impulses to the subtracter circuit 94. In this manner, the circuit illustrated in FIG. 7 assures that the impulses created by the actuating circuit 85, which are indicative of the total moisture content in the aggregate sensed by the probes 40 and 42, are subtracted from the preset impulses from the switch unit 92 before any impulses are sent to the meter 90, and there is no danger that the impulses from these two sources would meet at the meter and cancel each other out.

Figure 8:
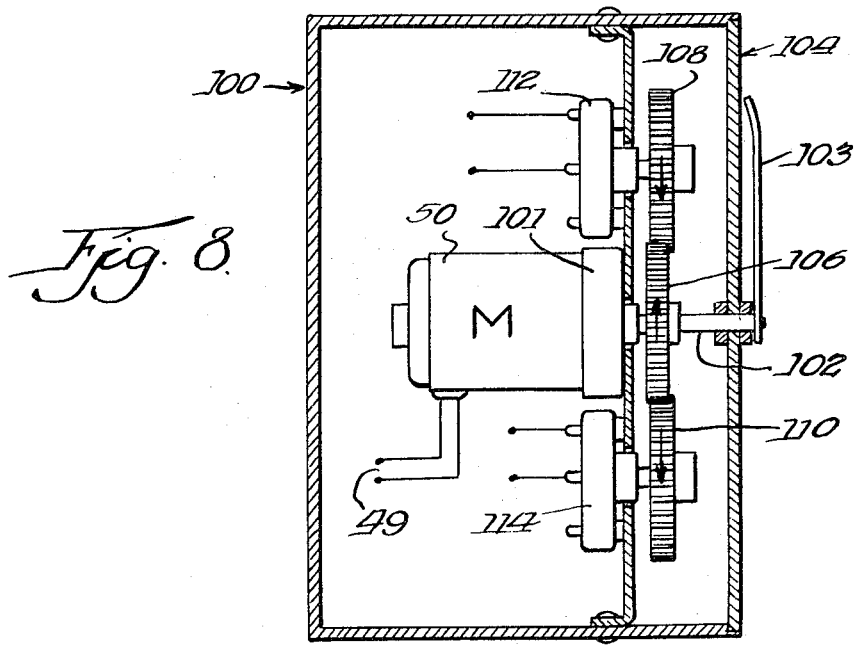
FIG. 8 is a schematic illustration of a third form of data-recording device which can be incorporated in the system of this invention, and which is adapted to automatically adjust the preset aggregate and water scales of a conventional electronic batch weighing and mixing system to compensate for the entrained moisture.

FIGS. 8 and 9 illustrate a third form of device 100 in accordance with this invention. The device 100 is adapted to be tied in to an electronic weighing and batching apparatus to automatically compensate for the entrained moisture of an aggregate by increasing the setting of an aggregate scale and decreasing the setting of a water scale in proportion to the total entrained aggregate moisture.

Accordingly, the device 100 includes the motor 50 which, as described above, has an output directly proportional to the total entrained aggregate moisture accumulated and measured by the probes 40, 42. A gear reducer 101 is provided on the output end of the motor 50 to gear the motor output down so that the associated output shaft 102 will not rotate a complete revolution for the biggest anticipated batch of aggregate. This arrangement allows the connection of an indicator arm 103 to the outer end of the shaft 102 so as to provide a visual reading of the measured moisture content on a suitable dial face 104.

In accordance with this invention, a driving gear 106 is mounted on the motor output shaft 102 and a pair of pinions 108 and 110 are mounted in meshing engagement with the gear 106 so that the pinions rotate in opposite directions. The gear 106 and pinions 108 and 110 will thereby rotate in proportion to the output rotation of the motor 50. Further, a potentiometer 112 is directly joined to the pinion 108, and a similar potentiometer 114 is directly joined to the pinion 110. By this arrangement the operation of the motor 50 will change the settings of the potentiometers 112 and 114 in opposite directions, and the change in the resistance provided by each potentiometer in turn will be proportional to the total entrained moisture signal which actuated the motor.

Figure 9A:
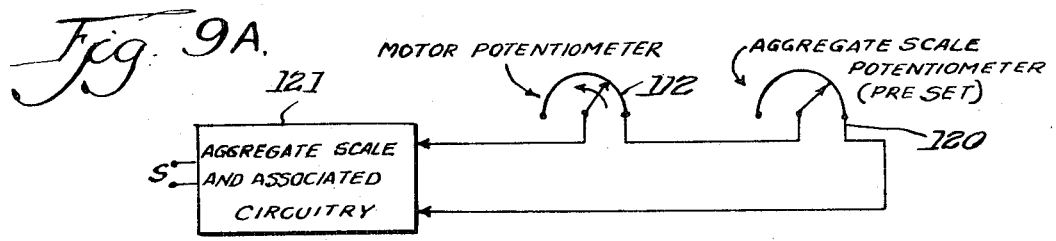
FIG. 9A is a schematic illustration of a suitable circuit for adjusting the aggregate scale employed with the form of data-recording device illustrated in FIG. 8.

Further, in accordance with this invention, the potentiometers 112 and 114 of the device 100 are connected into the circuitry of an electronic batching system to automatically compensate for the entrained moisture in the aggregate. FIG. 9A illustrates a suitable circuit for automatically adjusting the aggregate in such a manner, and FIG. 9B illustrates a suitable circuit for adjusting the water.

As illustrated in FIG. 9A, a conventional electronic batching system includes a potentiometer control 120 for selecting the desired weight of aggregate to be included in a batch. Generally, the potentiometer 120 is set by an operator so that it feeds a predetermined resistance into a conventional aggregate scale circuitry 121 which represents the desired weight of aggregate. When this desired weight is measured by the aggregate scale, the potentiometer 120 triggers a signal which stops the flow of aggregate onto the scale.

Under ideal conditions, where the aggregate has no entrained water, the aggregate weighed out by the scale circuit 121 will be accurate, and the amount of aggregate included in the batch will be equal to the value preset in the aggregate potentiometer 120. However, under most practical conditions, the aggregate weight will include the weight of entrained water and, hence, an additional amount of aggregate must be weighed to compensate for that water. To accomplish this, the potentiometer 112 of the device 100 is connected in series with the aggregate potentiometer 120, so that the resistances of the two potentiometers are added. Since the setting of the potentiometer 112 is a function of the entrained moisture content of the aggregate, as a result of the operation of the motor 50, the potentiometer 112 adds a resistance to the potentiometer 120 which is proportional to the entrained aggregate moisture. The aggregate scale circuitry 121 is thereby adjusted to add more aggregate weight to the batch to compensate for the entrained moisture.

Figure 9B:
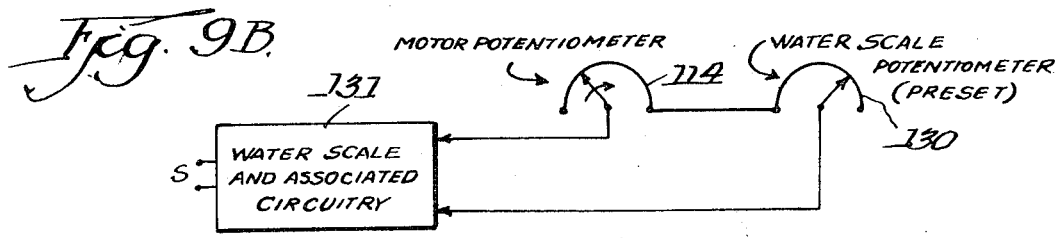
FIG. 9B is a schematic illustration of a suitable circuit for adjusting the water scale employed with the data-recording system of FIG. 8.

As illustrated in FIG. 9B, a conventional electronic batching system includes corresponding water scale circuitry 131 which responds to the setting of a control potentiometer 130 to add a selected weight of water to the aggregate batch. In accordance with this invention, the potentiometer 114 of the device 100 is electrically coupled with the potentiometer 130 to decrease the preset valve in the potentiometer 130 and thereby compensate for the entrained aggregate moisture.

Since the operation of the motor 50 in the device 100 rotates the potentiometer 114 in the opposite direction with respect to the above-described potentiometer 112, this subtraction of electrical values can be accomplished by coupling the potentiometers 114 and 130 as shown in FIG. 9B, so that the resistance of the potentiometer 114 is subtracted from the preset resistance of the potentiometer 130. Thus, the water scale circuit will receive an actuating signal which has been reduced in proportion to the measured aggregate moisture, and the amount of water added to the batch of aggregate will be correspondingly reduced.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A system for measuring and totalizing the moisture entrained in aggregate material discharged from a storage vessel to permit said entrained moisture to be compensated for when the aggregate is mixed with water comprising:
   a plurality of electrical probes arranged in an array which positions said probes for projection into a plurality of portions of a moving aggregate stream discharged from said vessel;
   means for mounting said probes so that the aggregate in said vessel flows in a stream over said probes;
   electrical circuit means including an energy source connected to said probes and creating an electrical reference signal which varies in amplitude proportional to the conductivity and hence the entrained moisture content of the stream of aggregate flowing past probes in each of said portions of said stream;
   signal-accumulating means comprising a variable speed electrical servomotor which is quickly responsive to said variations in amplitude of said reference signal to proportionately vary the output speed of a motor shaft, said servomotor being connected to said circuit means to produce output revolutions of said motor shaft proportional to both the time interval of aggregate flow and to said signal variations in said voltage produced by the variations in electrical conductivity of said flowing aggregate stream as sensed by said probes, so that the revolution of said motor shaft is thereby proportional to the total entrained moisture in the quantity of aggregate flowing past said probes;
   indicia means activated by said motor to provide indicia representative of the total entrained moisture in the aggregate discharged from said vessel during said time interval.

2. A moisture-measuring system in accordance with claim 1 wherein said electrical probes are arranged so that at least one pair of closely spaced probes is adapted to project into each quadrant of said stream of aggregate material and so that said electrical circuit means is normally open by the gap across said probes and is completed by the flow of electrical current through the stream of aggregate material flowing in said gap between said one pair of closely spaced electrodes.

3. A moisture-measuring system in accordance with claim 2 wherein said electrical circuit means connects said pairs of closely spaced probes in an electrical series arrangement.

4. A moisture-measuring system in accordance with claim 2 wherein said electrical circuit means connects said pairs of closely spaced probes in an electrical parallel arrangement.

5. A moisture compensating system in accordance with claim 2 wherein at least two of said pairs of probes are positioned on an electrical insulator plate provided on each side of said stream of aggregate material and wherein said means for mounting said probes comprises a pivoted joint connected to said insulator plates so that said probes can swing out of said aggregate stream in response to foreign objects and the like in said stream.

6. A moisture-measuring system in accordance with claim 1 wherein said indicia means comprises a visual display device including an arm connected to said motor output shaft and a dial face arranged adjacent said arm so that the position of said arm with respect to said dial face provides indicia representative of said measured entrained aggregate moisture.

7. A moisture-measuring system in accordance with claim 1 wherein said indicia means comprises a visual display device including a digital counter operatively connected to said motor output shaft so as to provide a totalized digital readout which is representative of said measured entrained aggregate moisture.

* * * * *

UNITED STATES PATENT OFFICE
CERTIFICATE OF CORRECTION

Patent No. 3,631,337　　　　　　　　Dated December 28, 1971

Inventor(s) Paul M. MacKinney

It is certified that error appears in the above-identified patent and that said Letters Patent are hereby corrected as shown below:

in column 8, line 28, delete "in said voltage"

Signed and sealed this 1st day of October 1974.

(SEAL)
Attest:

McCOY M. GIBSON JR.　　　　　　　C. MARSHALL DANN
Attesting Officer　　　　　　　　Commissioner of Patents